United States Patent [19]

Beuthling

[11] 4,322,862
[45] Apr. 6, 1982

[54] APPARATUS AND METHOD FOR FEEDING BEES

[75] Inventor: Irvin C. Beuthling, Roseville, Minn.

[73] Assignees: Gary J. Beuthling; John A. Miller, ; a part interest

[21] Appl. No.: 209,837

[22] Filed: Nov. 24, 1980

[51] Int. Cl.³ ............................................. A01K 53/00
[52] U.S. Cl. .......................................................... 6/5
[58] Field of Search ....................... 6/5, 6, 12 R, 12 M

[56] References Cited

U.S. PATENT DOCUMENTS

| 126,229 | 4/1872 | Peck | 6/5 |
|---|---|---|---|
| 562,853 | 6/1896 | Rooker | 6/5 |
| 1,108,277 | 8/1914 | Thale | 6/5 |
| 1,518,102 | 12/1924 | Philpott | 6/5 X |
| 4,081,556 | 3/1978 | Louveaux et al. | 426/2 |
| 4,214,329 | 7/1980 | Kozlowicz | 6/5 |
| 4,250,581 | 2/1981 | Kindall | 6/5 |

FOREIGN PATENT DOCUMENTS

| 24751 | 7/1919 | Denmark | 6/5 |
|---|---|---|---|
| 918585 | 2/1947 | France | 6/5 |

Primary Examiner—Robert Peshock
Assistant Examiner—Robert P. Swiatek
Attorney, Agent, or Firm—Kinney, Lange, Braddock, Westman & Fairbairn

[57] ABSTRACT

An apparatus for feeding liquid bee food to bees includes a tank for heating and storing a bee feed liquid, a hollow, horizontally extending bee food distributor situated above the tank, a horizontally elongated, forwardly and downwardly inclined liquid guide plate situated below the distributor, openings along the bottom edge of the distributor for evenly distributing the bee feed liquid from the distributor along an elongated horizontally extending upper portion of a front face of the guide plate, a conduit for delivering heated liquid feed from the tank to the distributor, and a longitudinally extending slot in the top of the tank in position to receive surplus bee feed coming off of the bottom edge of the liquid guide plate to let the feed fall back into the tank to be recirculated. A liquid access screen is situated in parallel, spaced relation with respect to the front face of the guide plate, and this screen is provided with spaced-apart holes therethrough of dimension to permit the passage of the proboscis of a bee to be fed while preventing passage of the head of the bee.

14 Claims, 5 Drawing Figures

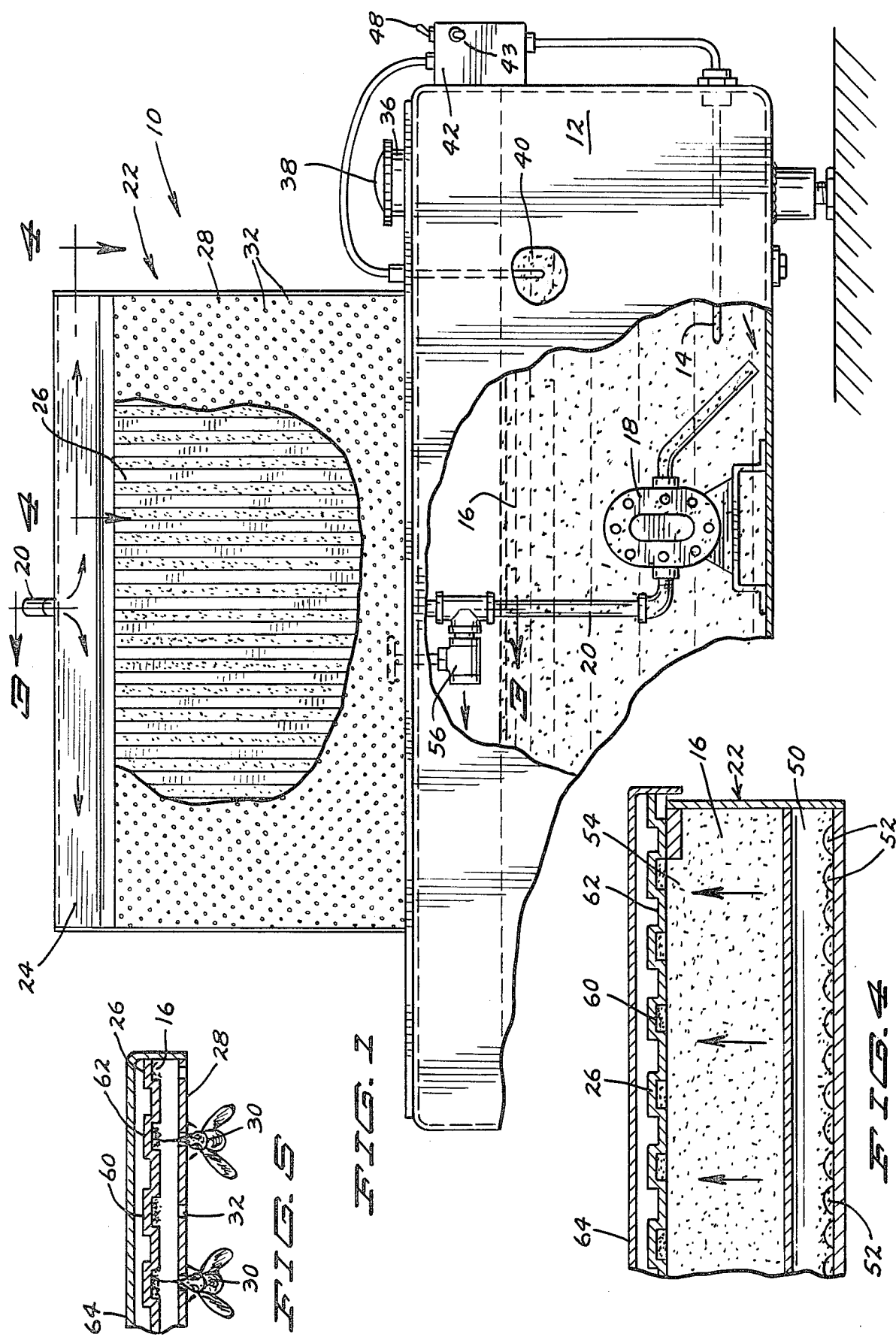

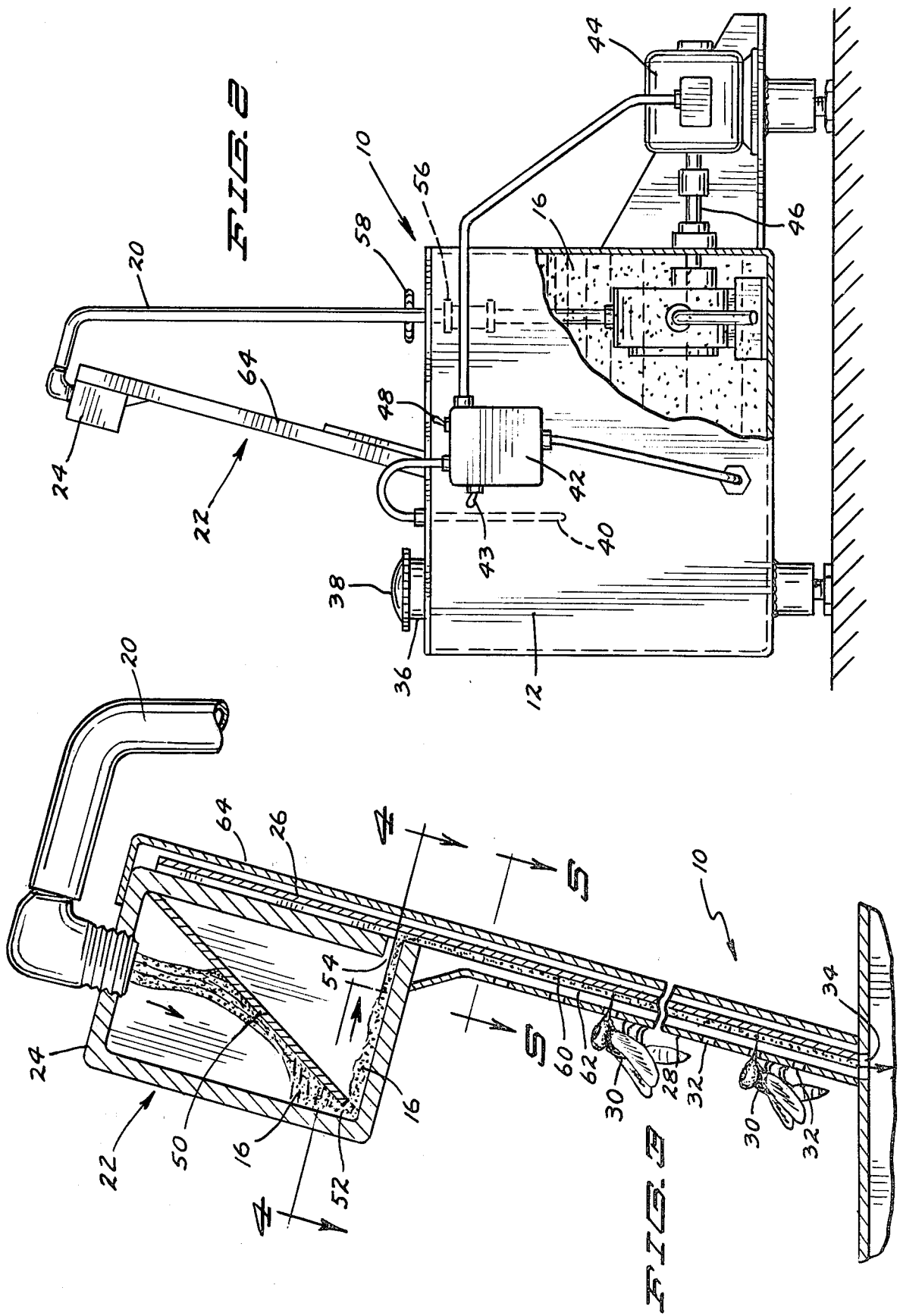

4,322,862

APPARATUS AND METHOD FOR FEEDING BEES

BACKGROUND OF THE INVENTION

This invention has relation to apparatus for feeding bees by a method which substantially reduces the possibility of bees becoming fouled with liquid feed while they are ingesting it, and, at the same time, keeps the feed liquid at an optimum temperature for feeding and handling.

A well recognized practice in apiculture, or the keeping of bees on a large scale, is to reduce or destroy the bee colonies at the end of the productive season and then to start with new bees at the beginning of the next season. Without providing some means of feeding the bees before the flora develops to an appropriate point in the springtime, the beginning of production in northern climes, for example, is unduly delayed, and the overall production for the season thus greatly reduced.

Others have developed formulations for liquid bee feeds which closely simulate the effects attained by bees feeding on the natural flora. One such formulation is a fructose solution. Another is described in U.S. Pat. No. 4,081,556 to Louveaux et al, granted in March of 1978. Any other liquid insect feed would work satisfactorily in the apparatus and in accordance with the method of the present invention.

Long ago, efforts were made to supply saccharine to bees in excess of the amounts they were able to gather from blossoms in order that the bees could be kept from starvation throughout the winter, and also to give them an easily accessible and ample suppy of food before the honey-gathering season begins. A search of the prior art revealed only two such attempts.

First, the patent to Rooker, U.S. Pat. No. 562,853 granted in June of 1896 disclosed a raft floating on a confined sea of liquid bee food, with an upper portion of this confined area being open to the hive. The bees came through these openings, stood on the raft, and reached down into the liquid to feed on it. The difficulty with this apparatus was the same difficulty encountered by the present inventor when he tried to feed bees from relatively open supplies of liquid bee food. Bee feed liquids are sticky in nature, and the bees tend to reach far down into the liquid as they would into a flower when feeding. The liquid then inevitably passes from the outside of the proboscis from forward portions of the head onto the feet, body, and most important, eventually onto the wings. This sticky liquid on the exterior of the bees, then, eventually disables and kills the bees. Entire hives have been lost in feedings where the bees have an access to the bee feed liquid such as disclosed in the Rooker patent.

Another attempt at providing bees an access to bee feed liquids is seen in the patent to Thale, U.S. Pat. No. 1,108,277, granted in August of 1914. This patent presents an elongated substantially flat hollow member having perforations in its upper face at one end and a bottle holder at the other end. Feed or syrup is allowed to pass from the bottle into the hollow member and to ooze up through the perforations where it will be consumed by bees. There was a slide which can be positioned to cover some part of the perforations. By covering and uncovering some of the perforations, different quantities of feed may be fed in different periods of time. This apparatus, then, presents an open area of syrup or bee feed liquid from which the bees are to feed. According to the experience of the present applicant, this will inevitably cause the bees to get their feet, their bodies, and more particularly, their wings fouled up and to thereby destroy themselves because of an inability to fly.

A search was made in the United States Patent and Trademark Office, and the Rooker and Thale patents were the only patents pertinent to a bee feeding apparatus and method which were located. Neither applicant nor those in privity with him know of any closer prior art or of any prior art which anticipates the claims made in this application.

In order to provide an apparatus and method for feeding bees to overcome the problems of the prior art, to insure that the bees do not come into fouling contact with a bee feed liquid, and to provide that the liquid be maintained at a temperature where it is easily manageable and readily assimilated by the bees, the present invention was developed.

BRIEF SUMMARY OF THE INVENTION

An apparatus for feeding bees includes a liquid bee food reservoir or tank in which the bee feed liquid is maintained at an appropriate temperature to insure that it will flow easily throughout the apparatus and to insure that it will attract, and be palatable to, bees to be fed. Bee feed liquid from the tank is fed to a horizontal distributor from which it is dispensed in equal quantities along the horizontal length of the distributor onto an inclined bee feed liquid guide plate. A perforated liquid access screen is situated in parallel slightly spaced relation to the guide plate in position where it will not be contacted by the liquid flowing on the plate, and this access screen is provided with perforations of dimension to allow the proboscis of each bee to pass through the access screen to position to intercept the liquid flowing on the guide plate. The size of these perforations and their spacing on the access screen is such that the bee can support itself on its feet on the screen while accessing the feed liquid.

In the form of the invention as shown, bee feed liquid not ingested by bees passes back into the reservoir or tank.

IN THE DRAWINGS

FIG. 1 is a front elevational view with parts broken away and parts in section of an apparatus for feeding bees in accordance with the method of the invention;

FIG. 2 is an end elevational view with parts broken away and parts in section of the apparatus of FIG. 1 as seen from the right in that figure;

FIG. 3 is an enlarged fragmentary vertical sectional view taken on the line 3—3 in FIG. 1;

FIG. 4 is a fragmentary sectional view taken on the line 4—4 in FIGS. 1 and 3; and FIG. 5 is an enlarged fragmentary sectional view taken on the line 5—5 in FIG. 3.

DESCRIPTION OF PREFERRED EMBODIMENT

An apparatus for feeding bees 10 including a fructose tank or liquid bee food reservoir 12, a thermostatically controlled immersion heater 14 located in a lower portion of the tank 12 below the surface of a fructose solution or other appropriate insect feed liquid 16 in that tank, a syrup or liquid pump 18 also submerged in fructose solution inside the tank, and a pressure feed line 20 to deliver the heated fructose solution from the pump to a bee feeding assembly 22 which is also part of the apparatus 10.

The bee feeding assembly 22 includes a horizontally extending distributor tube 24 which receives fructose solution from pressure feed line 20 and distributes it evenly over a front surface of a horizontally extending upper edge portion of a forwardly and downwardly extending inclined liquid guide plate 26. The fructose solution flows evenly down this liquid guide plate past a perforated liquid access screen 28 which is located in inclined, parallel, slightly spaced relation to the liquid guide plate 26 and the fructose solution flowing down it. This access screen 28 is provided with perforations or holes 32 therethrough of a size to permit a bee such as one of the bees 30 to project its proboscis through one of the holes into the flowing fructose solution and to allow the bee to withdraw without normally transferring any of the fructose solution onto the liquid access screen or onto any other part of its own body.

The fructose solution which passes to the bottom of the liquid guide plate 26 without being ingested by the bees passes through a longitudinally extending slot 34 in the top of the tank 12 and falls back into the fructose solution 16 in tank 12.

A filler port 36 in tank 12 is covered by a filler cap 38 when not in use. This port is provided for replenishing the supply of fructose solution as needed. Suitable panels (not shown) in the tank 12 and tube 24 can be provided for clean-out purposes. In the form of the invention shown, an immersible temperature sensor 40 is situated without the tank 12 to be under the surface of the fructose solution, and suitable controls lead from the sensor to a control box 42. Immersion heater 14 receives its power through the control box through any usual or preferred control system to maintain the temperature of the solution as read by the sensor 40 within predetermined limits satisfactory to keep the solution warm enough to project a signal of its availability to bees in the vicinity, to render the solution palatable to the bees and to insure smooth and controlled flow of the fructose solution from the tank down the liquid guide plate 26 and back to the tank. A heater control switch 43 is provided to alternately activate or disable the heater control circuit as needed.

An electric pump drive motor 44 outside tank 12 is connected through a drive shaft 46 and suitable tank seals to drive the syrup pump 18, and a pump control switch 48 is provided on the control box 42 to control power to the motor 44.

In the form of the invention as shown, the distributor tube 24 of the bee feeding assembly 22 is rectangular in transverse cross section. A flow deflection plate 50 extends the entire longitudinal dimension of the distributor tube and is positioned diagonally across it to intercept the flow of fructose solution from the feed line 20. The deflection plate 50 is imperforate except for the presence of flow deflection plate openings 52 provided along the bottom edge thereof. As best seen in FIGS. 3 and 4, a longitudinally extending distributor tube slot 54 is open through tube 24 to position immediately adjacent a front working face of the liquid guide plate 26. This allows fructose solution 16 flowing from the deflection plate openings 52 to flow evenly onto the guide plate from edge to edge thereof.

In order to get this even flow, it is necessary to regulate the flow of fructose solution so that there will always be a pressure "head" of solution above the top of each of the deflection plate openings 52 from end to end of the distributor tube 24. When more flow of fructose solution per minute is required, the "head" above the deflection plate openings 52 is increased by increasing the flow into the distributor tube, and when less flow is required, this "head" is decreased by decreasing the flow into the tube.

This regulation of flow of fructose solution 16 is obtained by use of a feed line bypass valve 56 located in the feed line 20 inside of the tank 12. A bypass valve control handle 58 extends out through the top of the tank 12 in the form of the invention shown. By using control handle 58 to open bypass valve 56 slightly, the pressure in pressure feed line 20 above the valve will be reduced, and consequently, the flow out of the feed line 20 into the distributor tube 24 will be reduced. Further opening of the bypass valve will further reduce the flow. The flow can be increased by closing the bypass valve 56 through the instrumentality of the exterior control handle 58. Normally the viscosity of solution 16, the capacity of pump 18, the total open area of openings 52 and other pertinent factors are such that closing valve 56 entirely will result in a flow into the distributor tube no greater than the maximum possible free flow through the deflection plate openings 52.

The liquid guide plate 26, in the form of the invention as shown, is constituted as a plurality of channels 60 interspersed with ridges 62, each channel and ridge lying in its own vertical plane and extending from top to bottom of the guide plate. Whether the flow from the distributor tube 24 is regulated so that the fructose solution flows primarily down the guide plate in the bottom of the channels or whether the flow is regulated so that the channels are more than full and the flow proceeds also down the ridges 62, the channels insure that there will be substantially even flow horizontally across the entire face of the guide plate from the left to the right thereof as seen in FIG. 1, for example. The flow will be so regulated that fructose solution will not come into contact with the access screen 28.

A bee feeding assembly outer casing 64 extends from the top of the distributor tube 24, in parallel spaced relationship to the liquid guide plate 26 and into sealing relation with the top of the tank 12. In normal operation, this casing will not come into contact with the fructose solution, but does provide a passageway between itself and the guide plate which could be utilized for providing additional heat to the fructose solution at the point that it is being accessed by the bees should this prove desirable in extremes of low temperature operation or for any other reason.

In one form of the invention, the liquid guide plate can extend forwardly and downwardly at a 15° angle with respect to the vertical. The liquid access screen 28 can be provided with holes 32 having a diameter of 1.2 mm, spaced on 12 mm centers. The underside of the liquid access screen 28 can be situated 2.4 mm away from the forwardmost surface of the liquid guide plate 26. That portion of the pressure feed line 20 above the feed line bypass valve 56 is slightly smaller in diameter than that portion of the feed line below the bypass valve to cause a slight restriction to flow into the distributor 24. If more restriction is needed, a fitting including an orifice of restricted diameter (not shown) can be inserted in this upper portion of feed line 20.

Operation of the immersion heater 14 and use of an immersible temperature sensor 40 to establish and maintain the temperature of the fructose solution 16 between 46° C. and 49° C. has been found to be satisfactory.

OPERATION

In accordance with the method of the invention, the apparatus will be stationed in an area where it can accessed by bees living in nearby or adjacent hives. The electric control box 42 will be connected with a conventional or other source of electric power (not shown) and heater control switch 43 will be activated to cause immersion heater 14 to begin bringing the main body of the fructose solution 16 up to a predetermined optimum temperature. With the solution 16 at a temperature at which it will flow easily, pump control switch 48 can be activated to cause syrup pump 18 to circulate the solution in the tank 12. Bypass valve control handle 58 can be activated to fully open feed line bypass valve 56 during this warm-up period to cause a more rapid and thorough circulation of the solution inside of the tank. Circulation through feed line 20 to distributor tube 24 and down liquid guide plate 26 can also be accomplished by partially or entirely closing bypass valve 56 once the solution in the tank gets warm enough so that it can be used to warm the feed line, distributor tube and liquid guide plate. A cover (not shown) can be temporarily put over the perforated liquid access screen 28 during this period if it is desired to prevent bees from feeding at that time.

With the liquid circulated to be up to its optimum temperature as measured by temperature sensor 40, or at any time as desired by the operator, feedline bypass valve 56 can be positioned to give the desired flow in volume per unit of time onto the liquid guide plate 26, and any temporary cover which has been put over the liquid access screen will be removed.

The temperature and makeup of a fructose solution, for example, will cause bees from adjacent or nearby hives to be attracted to the access screen 28, and each will position itself on the screen, and will insert its proboscis through one of the provided holes in the screen and will ingest the fructose solution or other appropriate bee feed liquid flowing down the screen.

More importantly, each bee will, when satisfactorily fed, withdraw its proboscis and fly away without carrying any of the liquid from its proboscis into contact with the access screen where it might be picked up by another bee or on other portions of its own body.

The embodiments of the invention in which an exclusive property or privilege is claimed are defined as follows:

1. An apparatus for feeding bees a liquid bee food, said apparatus including:
   A. a bee feed liquid tank;
   B. means for introducing a liquid bee food into said tank;
   C. a hollow, horizontally extending bee food distributor;
   D. means for delivering liquid feed from said tank to said distributor;
   E. a horizontally elongated, forwardly and downwardly inclined liquid guide plate situated below said distributor;
   F. means for substantially evenly distributing bee feed liquid from said distributor along an elongated horizontally extending upper portion of a front face of said guide plate; and
   G. a liquid access screen situated in parallel, spaced relation with respect to the front face of said liquid guide plate, said access screen being provided with spaced apart holes therethrough of dimension to permit the passage of the proboscis of an insect to be fed while preventing passage of the head of said insect, said screen being provided with sufficient surface adjacent the holes to support such insect in otherwise spaced relation to said guide plate and liquid thereon, said screen being close enough to said guide plate to permit bees to access liquid on said plate and far enough from said plate to prevent liquid on said plate from contacting said screen.

2. The apparatus of claim 1 wherein:
   H. means is provided to introduce liquid into said tank and there to maintain it within a predetermined temperature range.

3. The apparatus of claim 2 wherein:
   I. said means for delivering liquid from said tank to said distributor includes a liquid pump inside said tank and submerged in said liquid and a pressure feed line from said pump open to an upper portion of said distributor.

4. The apparatus of claim 3 wherein:
   J. said distributor includes a flow deflection plate dividing the interior of said distributor into upper and lower chambers, said flow deflection plate being provided with openings between said chambers at lower portions thereof.

5. The apparatus of claim 4 wherein:
   K. said means for evenly distributing liquid to said guide plate includes said flow deflection plate and an elongated horizontal slot provided through a lower portion of said distributor open to position above said upper portion of said front face of said guide plate.

6. The apparatus of claim 5 wherein:
   L. said liquid guide plate is provided with a plurality of alternating mutually parallel channels and ridges extending from top to bottom thereof, each such channel and ridge lying in its own vertical plane.

7. The apparatus of claim 6 wherein:
   M. a passageway is provided from a lower portion of said guide plate to an upper portion of said tank to permit liquid not ingested by bees to pass from the plate back into the tank.

8. The apparatus of claim 2 wherein:
   I. a passageway is provided from a lower portion of said guide plate to an upper portion of said tank to permit liquid not ingested by bees to pass from the plate back into the tank.

9. The apparatus of claim 1 wherein:
   H. said distributor includes a flow deflection plate dividing the interior of said distributor into upper and lower chambers, said flow deflection plate being provided with openings between said chambers at lower portions thereof.

10. The apparatus of claim 9 wherein:
    I. said means for evenly distributing liquid to said guide plate includes said flow deflection plate and an elongated horizontal slot provided through a lower portion of said distributor open to position above said upper portion of said front face of said guide plate.

11. The apparatus of claim 9 wherein:
    I. a passageway is provided from a lower portion of said guide plate to an upper portion of said tank to permit liquid not ingested by bees to pass from the plate back into the tank.

12. The apparatus of claim 1 wherein:
    H. a passageway is provided from a lower portion of said guide plate to an upper portion of said tank to permit liquid not ingested by bees to pass from the plate back into the tank.

13. A method of feeding bees including the steps of:
   A. providing a bee feeding liquid having a plane upper boundary surface and inclined at an angle to a horizontal plane;
   B. providing an otherwise imperforate liquid access screen having holes therethrough of dimension to permit penetration through said holes by the proboscis of each of the bees to be fed and to prevent penetration of the remainder of the bee therethrough, said screen having sufficient imperforate surface around each hole to support each bee on one side of said screen while its proboscis protrudes through one hole to the other side and to prevent contact between any part of such feeding bee and the periphery of any other hole;
   C. situating said screen in parallel, spaced relation to said plane surface at a distance to allow each bee proboscis to access said plane upper boundary surface while preventing said liquid from contacting said screen; and
   D. permitting bees to have access to a surface of said screen opposite said upper boundary plane.

14. A method for feeding bees including the steps of:
   A. causing a bee fee liquid to flow down a plane inclined at an angle to the horizontal;
   B. providing an otherwise imperforate liquid access screen having holes therethrough of dimension to permit penetration through said holes by the proboscis of each of the bees to be fed, and to prevent penetration of the remainder of the bee therethrough, said screen having sufficient imperforate surface around each hole to support each bee on one side of said screen while its proboscis protrudes through one hole to the other side and to prevent contact between any part of such feeding bee and the periphery of any other hole;
   C. situating said screen in parallel, spaced relation to said inclined plane at a distance to allow each bee proboscis to access bee feed liquid flowing on said plane while preventing said liquid from contacting said screen; and
   D. permitting bees to have access to a surface of said screen opposite said inclined plane.

* * * * *